Oct. 15, 1968      A. E. JUNKER      3,405,948

CARBON SEAL FOR HIGH SPEED SHAFT

Filed March 20, 1967

INVENTOR.
ARNOLD E. JUNKER
BY Charles M. Hogan
ATTORNEYS.

United States Patent Office 3,405,948
Patented Oct. 15, 1968

3,405,948
CARBON SEAL FOR HIGH SPEED SHAFT
Arnold E. Junker, Bridgeport, Conn., assignor to Avco Corporation, Stratford, Conn., a corporation of Delaware
Filed Mar. 20, 1967, Ser. No. 624,449
7 Claims. (Cl. 277—137)

ABSTRACT OF THE DISCLOSURE

Shaft sealing is provided by means of a split shaft carbon ring maintained under compression by means of a garter spring. The crack in the split ring is sealed by a solid carbon ring which is maintained in contact with the shaft at the location of the crack in the split ring. A third solid carbon ring surrounds the split ring to protect it from the effects of air pressure. The assembly is maintained in compression by means of a wavy washer. This seal is primarily useful where a high differential pressure exists across the seal.

Prior seal

This invention represents an improvement over applicant's previously filed, now pending, patent application Ser. No. 586,520 filed Oct. 13, 1966. That invention provides a seal with only two sealing elements and is primarily used where little or no pressure differential exists across the seal. The first element is a carbon ring with a single crack maintained in firm engagement with the shaft by a garter spring. The second element is a carbon ring having a portion maintained in contact with the shaft at the location of the crack by means of a spring between the second element and the seal casing. Thus, only two carbon rings provide effective sealing. When the two element seal is used in an application where high differential pressure exists, the primary seal ring shows excessive wear. The present invention is designed to overcome this problem.

Brief description of invention

Briefly described, this invention utilizes a primary sealing element comprised of a piston-type seal ring having a single crack and maintained in compression with the shaft by means of a garter spring positioned around the periphery of the ring. The crack is sealed by a one-piece ring maintained in contact with the shaft at the location of the crack. A third ring, having the same thickness as the first, surrounds the first ring and provides air sealing so that the first or primary ring is unaffected by high air pressures. The primary advantage of the arrangement is that the shaft-riding surfaces are not affected by the surrounding air pressure which causes excessive wear. Other advantages include the utter simplicity of the invention and the fact that the seal has the same case size as those requiring many more parts.

The drawings

Figure 1:
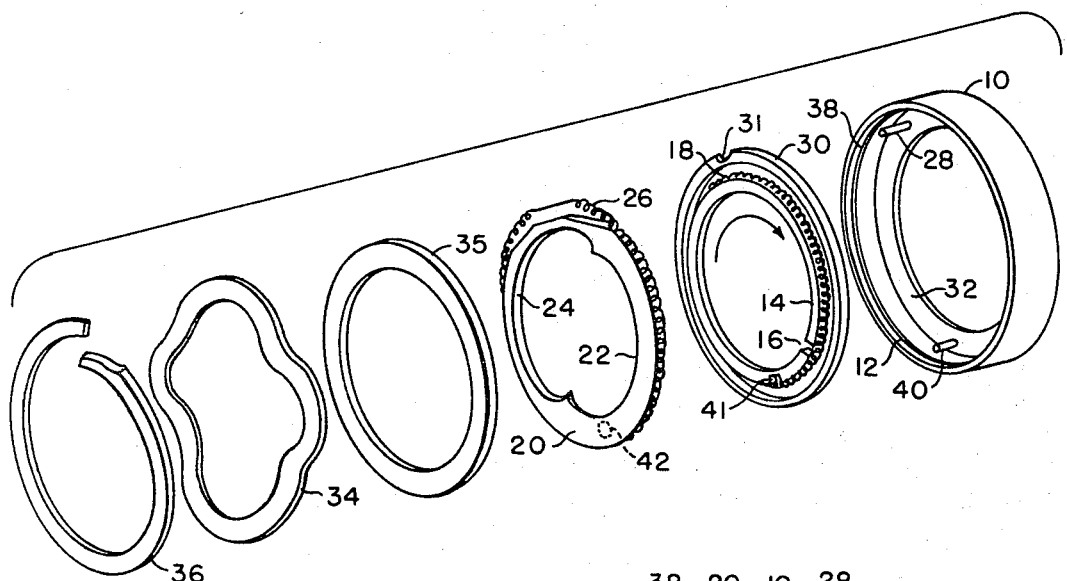
Figure 2:
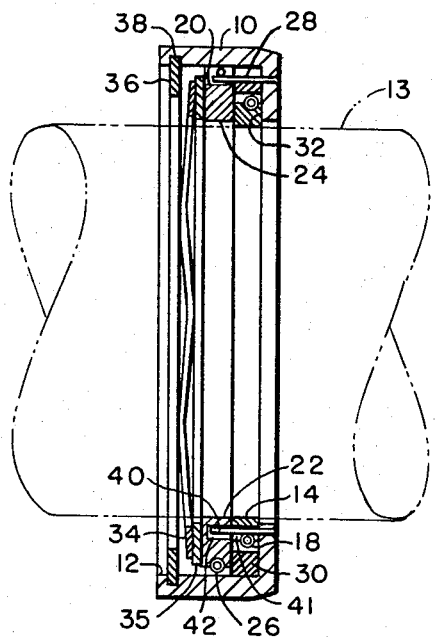

FIGURE 1 is a broken apart view of the various elements of an illustrative embodiment of the seal; and
FIGURE 2 is a cross sectional view of the seal of FIGURE 1.

The illustrative embodiment

The illustrated seal comprises an annular seal casing 10 for housing the various seal elements. The casing 10 has an aperture 12 permitting its positioning on a shaft 13.
The sealing elements comprise a split carbon ring 14 having a crack 16. The split carbon ring 14 is positioned on the shaft within the casing and is maintained in contact with the shaft by means of a garter spring 18. A second sealing element is a carbon ring 20 having a portion 22 shaped to conform to the shaft 13 and a portion 24 with a radial dimension enlarged over at least 180 degrees of its circumference so as to avoid shaft contact. A garter spring 26, positioned around the carbon ring 20 and held extended by a pin 28 on the seal casing 10, maintains the carbon ring 20 in contact with the shaft 13 directly behind the crack 16. A third carbon ring 30, having an internal diameter slightly larger than the external diameter of the split ring 14, is positioned concentrically on the split ring 14, and in surrounding relationship thereto. The ring 30 is provided with a notch 31 to permit the passage of the pin 28.

The entire assembly is contained within the casing 10 and held under pressure against the end wall 32 by means of a wavy spring 34 and a washer 35 maintained in place by means of a snap ring 36 fitting into an appropriate groove 38 on the inner periphery of seal casing 10. A pin 40 in the end wall 32, extending through a notch 41 and into a recess 42 in the seal ring 20, prevents the relative rotation of these elements.

It will be seen that the oil is sealed at the shaft by the carbon ring 14, and to prevent oil leaking through the crack 16, the crack 16 is sealed by the portion 22 of the carbon ring 20. Furthermore, the air, on the air side of the seal, is prevented from coming into contact with the carbon ring 14 by means of the carbon ring 30.

Various modifications and adaptations will be readily apparent to persons skilled in the art. It is intended, therefore, that this invention be limited only by the appended claims as interpreted in the light of the prior art.

I claim:
1. A seal for a rotatable shaft, the combination comprising:
   a stationary annular seal casing;
   a first seal ring positioned within said casing, the inner circumference of said first seal ring conforming to the outer circumference of said shaft, said first seal ring having a radial crack;
   first spring means for radially compressing said first seal ring against said shaft;
   a second seal ring having an inner diameter slightly larger than the outer diameter of said first seal ring and having a thickness equal to said first seal ring, said second seal ring being positioned in surrounding relationship to said first seal ring;
   a third seal ring positioned on said shaft adjacent said first and second seal rings;
   and second spring means for urging said third seal ring into contact with said shaft at the position of said crack and with said first and second seal rings.

2. The invention as defined in claim 1 and means for preventing the relative rotation of said first and third seal rings.

3. The invention as defined in claim 1 wherein said second spring means includes a garter spring positioned around the periphery of said third seal ring, and at least one pin on said casing, said garter spring being engaged by said pin.

4. The invention as defined in claim 3 wherein the inner circumference of said third seal ring is larger than the outer circumference of said shaft, except for a portion thereof adjacent said crack, said portion being less than 180 degrees and conforming generally to the contours of said shaft.

5. The invention as defined in claim 1 wherein said first spring means is a garter spring positioned around the periphery of said first seal ring.

6. The invention as defined in claim 5 wherein the inner circumference of said third seal ring is larger than the outer circumference of said shaft, except for a portion thereof adjacent said crack, said portion being less than 180 degrees and conforming generally to the contours of said shaft.

7. The invention as defined in claim 6 wherein said means for urging said third seal ring into contact with said shaft comprises a garter spring positioned around the periphery of said third ring and at least one pin on said casing, said spring being engaged by said pin.

References Cited

UNITED STATES PATENTS

| 1,848,328 | 3/1932 | Durham | 277—142 |
| 2,867,458 | 1/1959 | Kroekel | 277—137 |
| 2,908,516 | 10/1959 | Stein | 277—137 |

FOREIGN PATENTS

| 826,895 | 1/1960 | Great Britain. |

SAMUEL ROTHBERG, *Primary Examiner.*